Sept. 26, 1939.　　　F. W. SULLINGER　　　2,174,015
DIRECTION FINDER
Filed April 8, 1937　　　3 Sheets-Sheet 1

INVENTOR
Ferris W. Sullinger
BY
Hoguet, Neary & Campbell
his ATTORNEYS

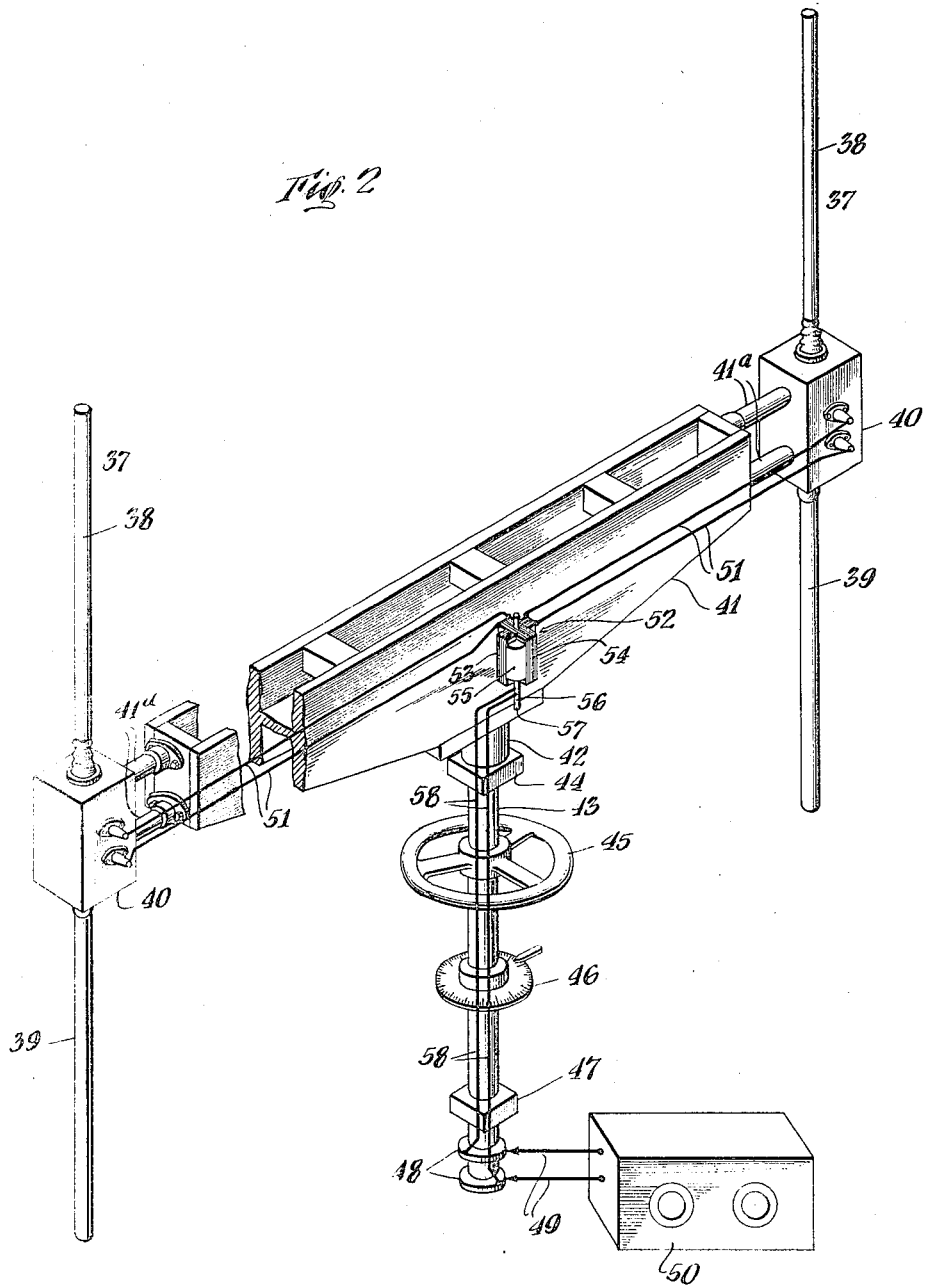

Sept. 26, 1939. F. W. SULLINGER 2,174,015
DIRECTION FINDER
Filed April 8, 1937 3 Sheets-Sheet 3
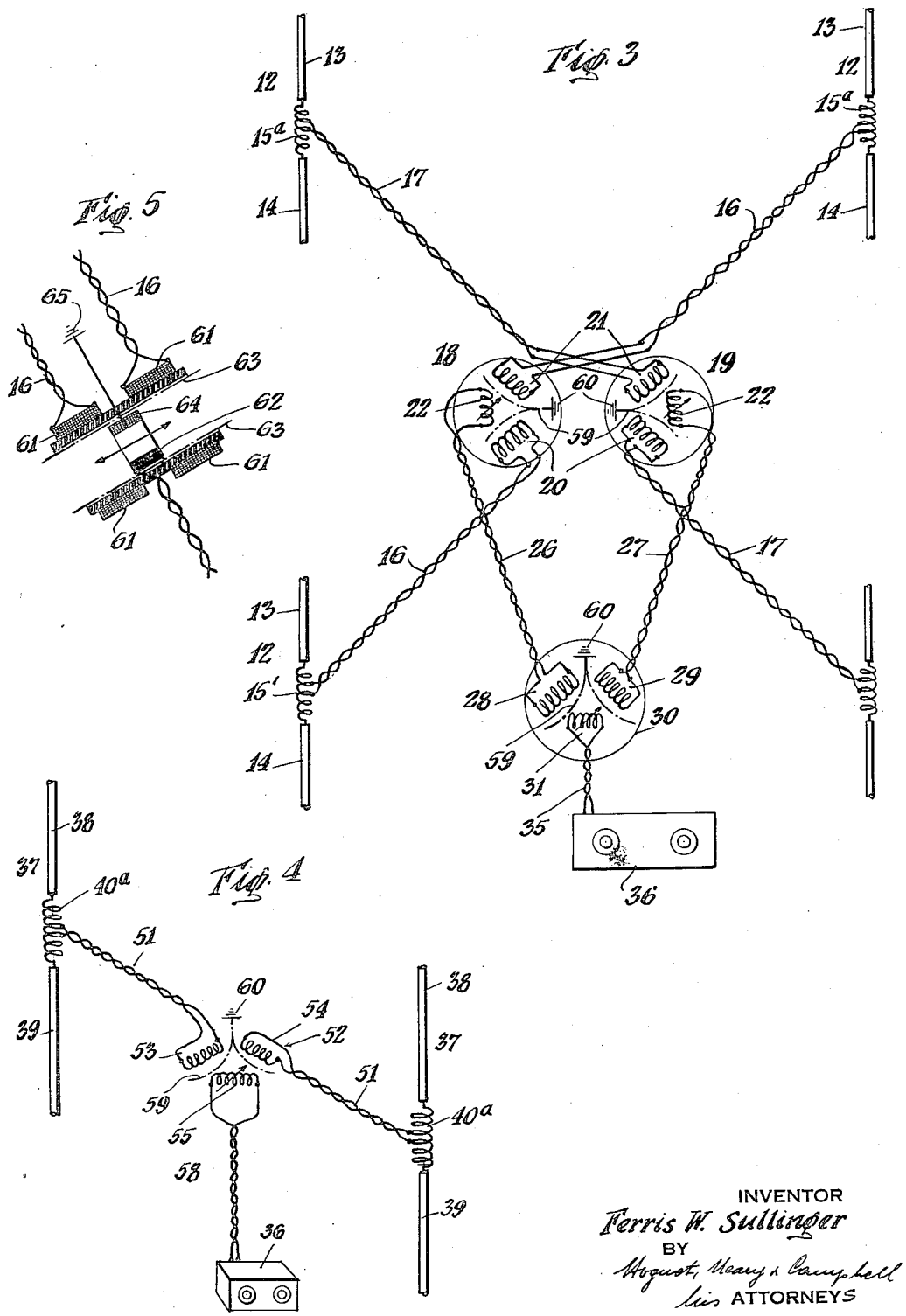
INVENTOR
Ferris W. Sullinger
BY
August, Meany & Campbell
his ATTORNEYS Patented Sept. 26, 1939

2,174,015

UNITED STATES PATENT OFFICE

2,174,015

DIRECTION FINDER

Ferris W. Sullinger, Coral Gables, Fla., assignor to Pan American Airways Corporation, Jersey City, N. J., a corporation of Delaware Application April 8, 1937, Serial No. 135,651

8 Claims. (Cl. 250—11)

My invention relates to radio direction finders and more particularly to variable coupling devices such as a radio goniometer, for electrically balancing the direction finders to produce sharply defined, accurate indications of the direction of arrival of the received signal waves and thereby the direction of the station from which they were transmitted.

In my copending joint application, Serial Number 124,108, filed February 4, 1937, there is disclosed a radio direction finder of the Adcock type, which is electrically balanced by means of variable condensers connected to the dipole antenna rods. Proper adjustment of these variable condensers electrically balances the capacities of opposite dipoles so that they furnish the same signal voltage to the midpoint of the system, and, accordingly produce sharp signal minima in the receiver. These sharp minima produce accurate indications of the direction of arrival of the received waves and thereby the true direction of the transmitting station, which may be on the ground or aboard aircraft.

In accordance with my present invention, I effect the desired electrical balance in the radio direction finder and consequently obtain accurate indications of the direction of arrival of the received waves, by equalizing at the electrical center of the system any unequal signal voltages supplied by opposite antenna. I effect this voltage equalization by use of variable coupling devices, particularly radio goniometers connected between opposite dipole antennae at the electrical center of the direction finder system. The radio goniometers are so arranged that by adjustment of their rotors, any electrical dissymmetry or unbalance in the system caused by unequal voltages supplied by opposite dipoles, will be compensated for. Consequently, the radio goniometers effectively supply to the station radio goniometer, commonly used with the spaced-fixed type of direction finder, the same E. M. F. from opposite dipoles. Since the voltages from opposite dipoles are in phase opposition sharply defined minima or null points are obtained in the station goniometer and are heard in the radio receiver, which is electrically connected to the station goniometer. One of the characteristic features of my invention is the sharp minima produced in the radio receiver whereby the direction of the signal source is sharply and accurately indicated.

An object of my invention is to produce a radio direction finder that is in effect electrically symmetrical and accurately indicates at all times the exact direction of arrival of received waves.

The novel features of the invention are set forth with particularity in the appended claims. The invention itself, however, both as to organization and method of operation will be clearly understood from the following description taken in conjunction with the accompanying drawings, in which:

Figure 2 is a perspective view of my radio direction finder of the two dipole elevated rotatory type showing the general mechanical layout.

Figure 3 illustrates diagrammatically the electrical system for the spaced-fixed type of direction finder shown in Fig. 1, particularly the goniometer connections between opposite dipole antennae and the station goniometer for equalizing the signal voltages supplied by these antennae;

Figure 4 illustrates diagrammatically the electrical system for the rotatory type of direction finder shown in Fig. 2;

Figure 5 illustrates another form of variable coupling device that may be used in place of the goniometers connecting opposite dipoles; the movable winding being slidable rather than rotatory.

Figure 1:
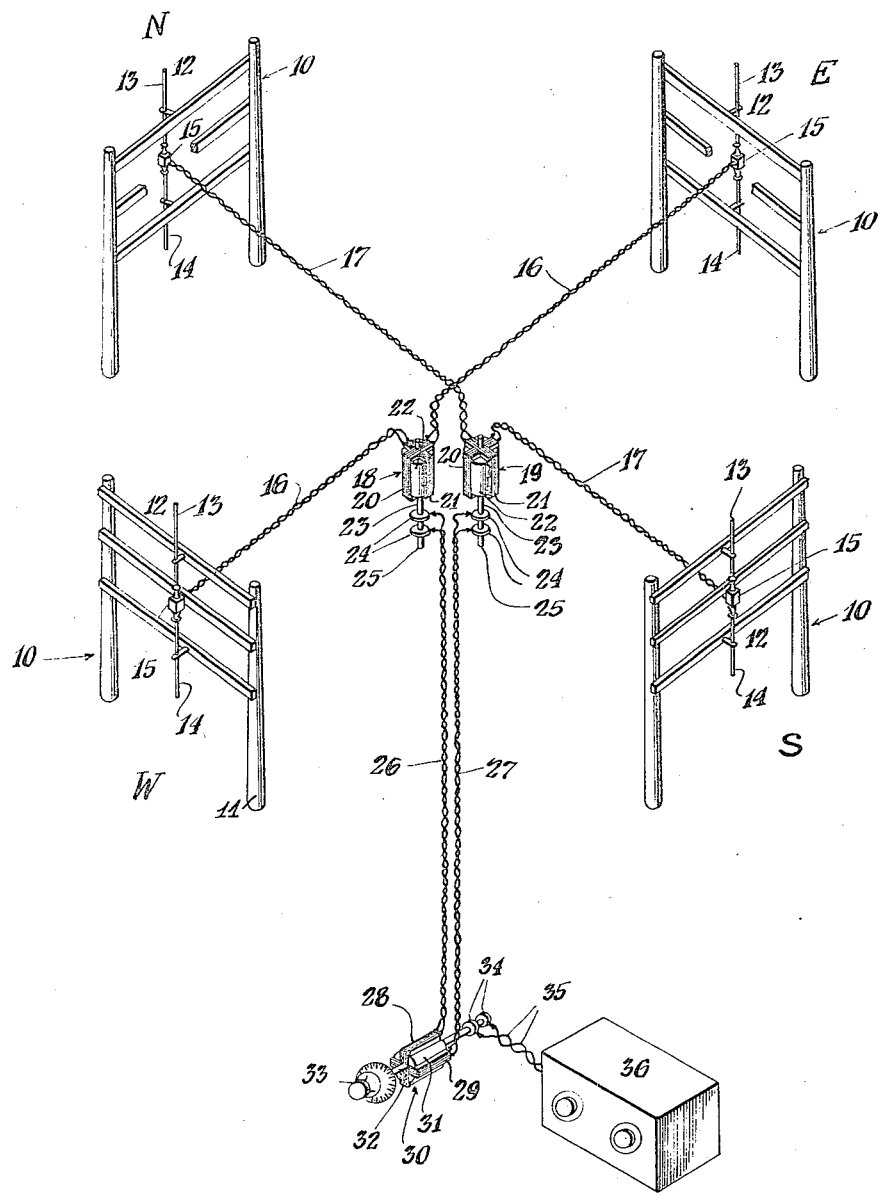
Figure 1 is a perspective view of my radio direction finder of the four dipole elevated spaced-fixed type showing the general mechanical layout.

Referring now to the drawings and in the first instance to Fig. 1, it will be noted that the spaced-fixed radio direction finder in this embodiment comprises four vertical elevated dipole assemblies 10 spaced 90° apart. These assemblies comprise a supporting construction 11, the details of which are disclosed in my copending application Ser. No. 135,650 filed April 8, 1937, Patent No. 2,166,100 dated July 11, 1939; and dipoles 12. Each dipole 12 has an upper arm 13 and a lower arm 14 connected together through a matching transformer the container for which is shown at 15. Opposite dipoles are electrically connected in phase opposition by means of transmission lines 16 and 17 which are electrically transposed as shown in Fig. 3. At the electrical center points of the lines 16 and 17 are connected coupling goniometers 18 and 19 respectively. The electrical connections for these goniometers are illustrated more in detail in Fig. 3. Each of the two goniometers 18 and 19 has two stationary stator coils 20 and 21 and a rotor 22 rotatable by a shaft 23. Each shaft 23 carries two slip rings 24 and is slotted at its lower end, as shown at 25, to engage a non-conductor member, not shown, for rotating the shaft. Lead lines 26 and 27 connect goniometers 18 and 19 respectively with two stator coils 28 and 29 of the station radio goniometer 30. This station goniometer 30 is of conventional type and has a search coil or rotor 31 which is mounted on a shaft 32 and is rotatable in the stator coils 28 and 29. The shaft 32 carries on one end a dial 33 and on the other end two slip rings 34. The goniometer 30 is connected through slip rings 34 and lead lines 35 to a conventional type radio receiver 36.

During operation of the spaced fixed direction finder shown in Fig. 1, the rotor or search coil 31 of the station goniometer 30 is rotated until a minimum signal is obtained in the receiver 36. A reading of the dial 33 will then give the direction of arrival of the waves received by the dipoles 13. The use of the coupling goniometers 18 and 19 to electrically balance the direction finder is explained in detail hereinafter. Suffice it to say at this point that the rotor winding 22 of each goniometer is rotated until the voltages supplied by opposite dipoles to the stator windings 20 and 21 respectively are equalized. The rotation of the rotors 22 may be effected from the ground by means of a light non-conductor rod such as a bamboo pole that has a tongue formed on one end to engage the slots 25 in the rotor shafts 23. If desired, the coupling goniometers 18 and 19 may be located at ground level, adjacent the station goniometer 30, in which event the rotors 22 may be adjusted by direct manual rotation of the rotor shafts 23.

In Fig. 2 there is illustrated a two dipole elevated rotary type of direction finder which comprises two dipole assemblies 37 each having an upper arm 38 and a lower arm 39. The two arms are connected to a box or other suitable container 40 for housing a matching transformer, which electrically connects the upper and lower dipole arms as shown in Fig. 4. The two dipole assemblies are spaced and supported by an I shaped beam 41 which may be electrically insulated from the boxes 40 and spaced therefrom by connecting insulators 41a. Attached to the bottom of the I beam 41 and substantially at its center point is a connecting flange 42. The shaft 43 which is used for rotating the system is connected to the flange 42 in any suitable manner. A roller or other bearing 44 is mounted on the shaft 43 adjacent to the flange 42 for effecting easy rotation of the shaft. The shaft 43 carries a hand wheel 45, a dial 46 and another bearing 47. At the lower extremity of the shaft are mounted two slip rings 48 that are insulated from the shaft in some suitable manner.

The dipoles 37 are electrically connected by transmission lines 51 to the two stator windings 53 and 54 of a goniometer 52 located at the center of the system. The rotor 55 of this goniometer is mounted on a shaft 56 which has its lower end slotted as shown at 57 for rotation, as explained above. The rotor winding 55 is electrically connected by lead lines 58 to the two slip rings 48. These slip rings 48 are in turn connected by lead lines 49 to a conventional type of radio receiver 50.

For operation of the system shown in Fig. 2 the shaft 43 is rotated by means of the handwheel 45. The shaft 43 being connected to the flange 42 and connecting I beam 41 as above described causes rotation of the I beam and associated dipole assemblies 37 about the center point of the system. The handwheel 45 is rotated until a sharp minimum or null point is obtained in the receiver 50. The dial 46, which may be any conventional form of dial, then indicates the angular direction of arrival of the received wave in degrees east of north. The method of rotating the rotor 55 of the goniometer 52 to equalize any unequal voltages supplied by the opposite dipole assemblies to the stator windings of this goniometer is the same as that described above for the spaced-fixed system shown in Fig. 1; also, the goniometer 52 may be located either at ground level or in an elevated position adjacent the I beam 41.

In Fig. 3 there is illustrated the electrical relationships of the four dipole assemblies, coupling goniometers, station goniometer and receiver shown in Fig. 1. Each of the four dipoles 12 has its upper arm 13 connected to its lower arm 14 through a matching transformer 15a. Opposite dipoles are connected by transposed transmission lines 16 and 17. The outer ends of these lines are tapped across a suitable number of turns of the matching transformers 15a, as shown, and the inner ends of these lines are connected in phase opposition to the four stator windings 20 and 21, of the goniometers 18 and 19. Located in the two electrical fields of the four stator windings 20 and 21 are two rotor windings 22. The stator windings in each goniometer are shielded from each other and from the rotor winding by means of an electrostatic shield 59; these shields are grounded as shown at 60.

The search coils or rotor windings 22 are electrically connected by means of transposed transmission lines 26 and 27 to the two stator windings 28 and 29 of the station goniometer 30, which has also a rotor winding 31 located in the magnetic field of the windings 28 and 29. An electrostatic shield 59 shields the stator and rotor windings and is grounded as shown at 60. The rotor winding 31 of this station goniometer 30 is connected by transmission lines 35 to the radio receiver 36.

The coupling goniometers 18 and 19 serve the dual purpose of equalizing any unequal voltages supplied by opposite dipoles, and of matching the impedance of the transmission lines, connecting opposite dipoles, with the impedance of the transmission lines connecting these coupling goniometers with the station goniometer. The equalizing of voltages supplied by opposite dipoles provides sharp minima and thereby accurate indication of the direction of arrival of the received waves as mentioned above. If, as is normally the case, unequal voltages were supplied by opposite dipoles and no means were provided for equalizing these voltages at the electrical center point of the system, then sharp minima could not be produced in the receiver and therefore accurate indications of the direction of arrival of the received waves could not be obtained. In the system of my present invention the coupling goniometers 18 and 19 have the necessary electrical characteristics to match the impedance of the transmission lines connecting opposite dipoles with the impedance of the transmission lines leading to the station goniometer.

In my above mentioned copending application Serial No. 124,108 adjustment of the variable condensers effectively produces equal voltages from opposite dipoles. In accordance with the present invention these variable condensers may be used to produce equal voltages at the center point of the system, in which case the coupling goniometers 18 and 19 would serve principally the purpose of matching impedances of the transmission lines as described above. The goniometers might also be used for effecting any necessary subsequent balancing of the direction finder.

Fig. 4 illustrates the electrical relationships for the elevated rotary system, the mechanical features of which are shown in Fig. 2. As shown in Fig. 4, the opposite dipoles 37 are connected by means of transposed transmission lines 51 to a single coupling goniometer 52. This goniometer has two stator windings 53 and 54 and a rotor winding 55. An electrostatic shield 59 is provided for shielding the three windings, as described above, and is grounded at the point 60. With the rotary type of direction finder a station goniometer is not required and therefore the rotor winding 55 of the coupling goniometer 52 is connected directly by means of transmission lines 58 to the radio receiver 36. The coupling goniometer 52 serves the above-described purpose of equalizing any unequal voltages supplied by opposite dipoles 37, and of matching the impedance of transmission lines 51 and 58.

In Fig. 5 there is illustrated an alternative form of variable coupling device for equalizing the unequal voltages supplied by opposite dipoles to the electrical center point of the system. This alternative arrangement comprises two fixed or stator windings 61 which are electrically connected to opposite dipoles by means of transposed transmission lines 16. A movable winding 62 is located within the magnetic field of the fixed windings 61 and is adapted to be moved in transverse direction as indicated by the arrows. The winding 62 therefore has a sliding type of movement instead of the rotatory movement of the rotor windings in the goniometers. This slidable winding 62 is electrostatically shielded from the fixed windings 61 by means of an electrostatic shield 63. The center point of the winding 62 and the electrostatic shield 63 are grounded as shown at 65. The slidable winding 62 is electrically connected to the radio receiver when used with a two dipole elevated rotary system such as is shown in Fig. 4; or is connected to one stator winding of the station goniometer when used with a four dipole space-fixed system such as shown in Fig. 3. It will be understood that in the latter case two of the variable coupling devices shown in Fig. 5 will be needed, one for each pair of opposite dipoles.

A discussion of the procedure for electrically balancing the direction finder and the factors influencing the same is given below.

The electromotive forces supplied by opposite antennae, and which must be equalized to produce sharp minima as described above, are affected by a number of conditions, as for example, the over-all length of the antenna, the total inductance of the matching transformer coil or other means used for connecting the upper and lower arms of the dipoles, the inductance of that portion of the connecting coil across which the transmission line is tapped, the attenuation of the transmission line and the capacity across the connecting coil. If, for example, opposite dipoles have different capacities to ground they will not supply the same E. M. F. to the midpoint of the direction finder and unless the unequal E. M. F.'s are compensated for sharp minima will not be produced in the receiver.

The procedure of electrically balancing the direction finder so that opposite dipoles deliver the same E. M. F. to the midpoint of the system and thereby produce sharp minima comprises the following: The direction finder system such as illustrated in Fig. 1, being installed in an operative position, a local radio frequency oscillator is placed on the ground in line with the north and south dipoles and a short distance beyond either.

The search coil of the station goniometer is then turned to give minimum signal output from the radio receiver, which is tuned to the oscillator frequency. The rotor winding 22 on the coupling goniometer 18 is then turned until a setting is found which gives the sharpest minimum or null point in the receiver 36. When this point has been found the voltage induced in the rotor 22 of goniometer 18 by the stator winding 20 is the same as that induced in the rotor 22 by the stator winding 21; these voltages being equal and in phase opposition will balance out so that the effective signal voltage in the receiver 36 will be approximately zero. When this condition has been established, the east and west dipole assemblies will then be balanced.

To balance the north and south dipoles, the local oscillator is positioned in line with the east and west dipoles and a short distance beyond either. The same procedure described just above is then carried out for balancing the north and south dipoles. In this case the rotor 22 of goniometer 19 is manipulated.

The procedure for electrically balancing a two dipole rotatory type of direction finder, such as illustrated in Fig. 2, comprises placing the local oscillator at a suitable distance from the direction finder and rotating the dipoles 37 by turning the hand wheel 45 until a minimum signal is obtained in the radio receiver 50. Then the rotor winding 55 of the goniometer 52 is rotated, in the manner described above, until the sharpest minimum signal or null point is obtained in the radio receiver. This sharp minimum signifies that the electromotive forces supplied by the dipoles to the center point of the system have been equalized by adjustment of the goniometer 52.

It will be understood that various modifications may be made in the direction finder systems disclosed herein without departing from the scope of my invention. For example, single conductor types of vertical antennae may be used in place of the dipoles shown in the drawings, and any other suitable type of variable coupling devices may be used instead of the sliding and rotating coil types illustrated.

Other modifications of the preferred embodiments of the invention disclosed herein lie within the scope of the appended claims.

I claim:

1. A radio direction finder system comprising a pair of vertical spaced antennae, a variable coupling device having separate fixed windings and an adjustable winding, each fixed winding being electrically connected to one of said antennae at the electrical center of the system, means for adjusting the adjustable winding to equalize the voltages supplied by said antennae to the center of the system, and adjustable means associated with said antennae for effectively orienting the directional antennae response pattern with respect to a signal source to determine the direction of said source.

2. A radio direction finder comprising a pair of spaced dipole antennae, a variable coupling device having a pair of angularly related fixed coils and a movable coil, transmission lines electrically connecting each of said antennae to a different fixed coil, a radio receiver, means electrically connecting the movable coil to said receiver, means for adjusting said movable coil to equalize the electromotive forces delivered by said antennae, and adjustable means associated with said antennne for effectively orienting the directional antennae response pattern with respect to a signal source to determine the direction of said source.

3. A radio direction finder comprising a pair of vertical antennae, a radio receiver for interpreting the signals received by said antennae, a goniometer having angularly related stator windings and a rotor winding, transmission lines connecting each stator winding to a different antenna, means electrically connecting the rotor winding to said receiver, means for adjusting the rotor winding of said goniometer for effectively equalizing the signal voltages supplied by said antennae to the center of the system, and adjustable means associated with said antennae for effectively orienting the directional antennae response pattern with respect to a signal source to determine the direction of the said source.

4. A radio direction finder comprising a pair of vertical antennae, a goniometer having a pair of stator windings and a rotor winding, transposed transmission lines connecting each antenna to a different stator winding so that voltages in time phase in said antennae will produce voltages 180° out of time phase in the rotor winding, means for adjusting the rotor winding for equalizing the signal voltages supplied by said antennae, and adjustable means associated with said antennae for effectively orienting the directional antennae response pattern with respect to a signal source to determine the direction of said source.

5. A radio direction finder comprising a first pair of spaced vertical dipole antennae, a second pair of spaced vertical dipole antennae disposed in a line substantially at right angles to a line between the first pair of antennae, a pair of variable coupling devices each having two fixed coils and a movable coil, transmission lines connecting each antenna of the first pair of antennae to a different fixed coil of one variable coupling device, transmission lines connecting each antenna of the second pair of antennae to a different fixed coil of the other variable coupling device, and means for adjusting said movable coils to equalize the voltages supplied by said antennae.

6. The device set forth in claim 5 comprising a station goniometer having two angularly related fixed coils and a search coil, and means electrically connecting the movable coils of said variable coupling devices to different fixed coils of said goniometer, a radio receiver and electrical connections between said receiver and said search coil.

7. A radio direction finder comprising a pair of spaced dipole antennae, each antenna having an upper and a lower portion and a matching impedance connected between said portions, a variable coupling device having a pair of fixed coils and a movable coil, transposed transmission lines connecting each of the said antennae to a different fixed coil, means for adjusting said movable coil to equalize the electromotive forces delivered by said antennae, and adjustable means associated with said antennae for effectively orienting the directional antennae response pattern with respect to a signal source to determine the direction of said source.

8. A radio direction finder comprising a pair of vertical dipole antennae, an elongated member supporting said antennae in spaced relationship, said member being rotatable in a horizontal plane about a vertical axis disposed midway between said antennae, a variable coupling device having a pair of fixed coils and a movable coil, transposed transmission lines connecting each of said antennae to a different fixed coil, and means for adjusting said movable coil to equalize the signal voltages delivered by said antennae.

FERRIS W. SULLINGER.